Dec. 6, 1938.  G. W. MASON  2,138,976
DIRECTION SIGNAL
Filed July 14, 1937  4 Sheets-Sheet 1

George W. Mason
INVENTOR

BY Victor J. Evans & Co.
ATTORNEYS

R. E. Wise
WITNESS

Dec. 6, 1938.  G. W. MASON  2,138,976
DIRECTION SIGNAL
Filed July 14, 1937  4 Sheets-Sheet 2
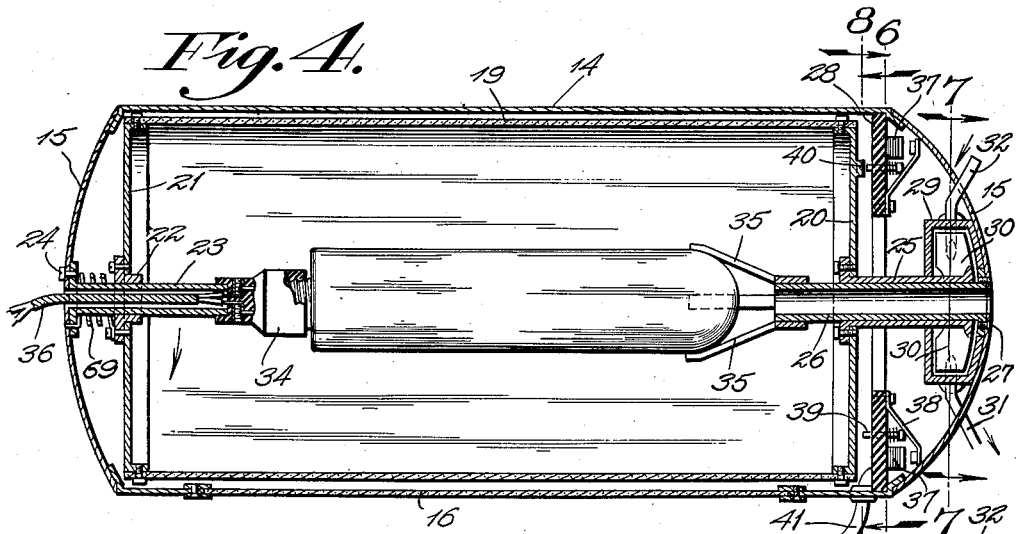
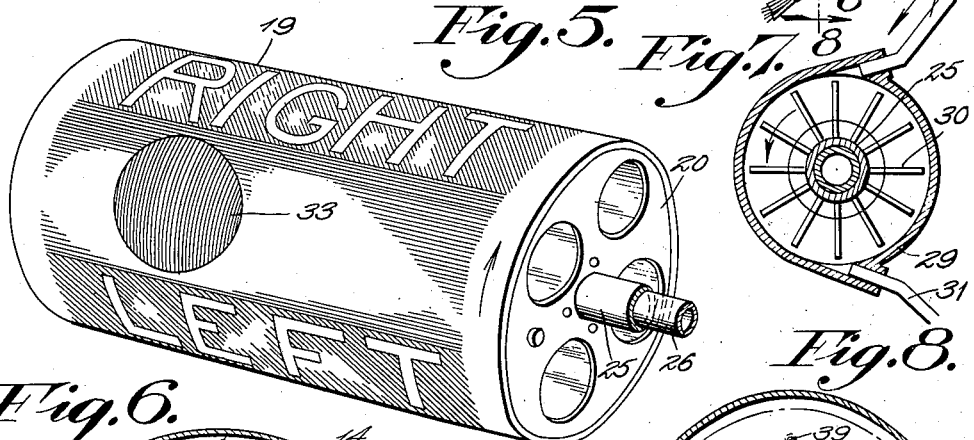
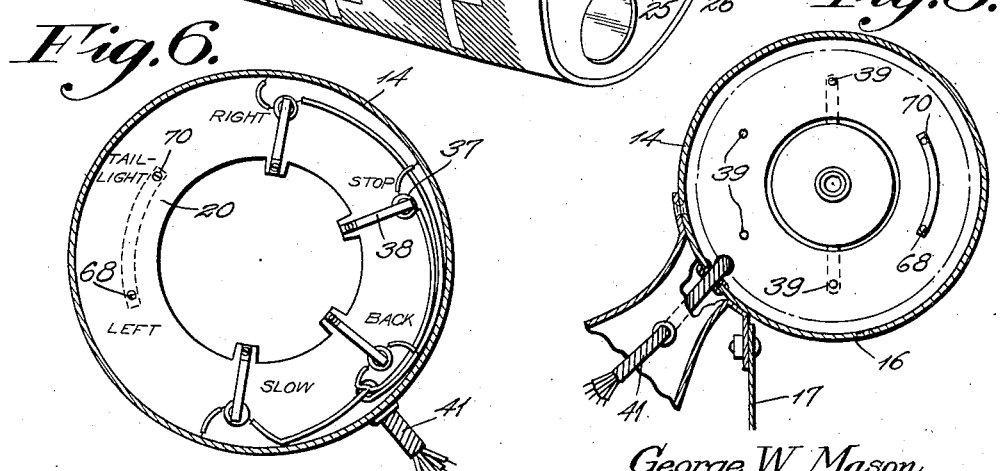
George W. Mason
INVENTOR
BY Victor J. Evans & Co.
ATTORNEYS
WITNESS Dec. 6, 1938.   G. W. MASON   2,138,976
DIRECTION SIGNAL
Filed July 14, 1937    4 Sheets-Sheet 3
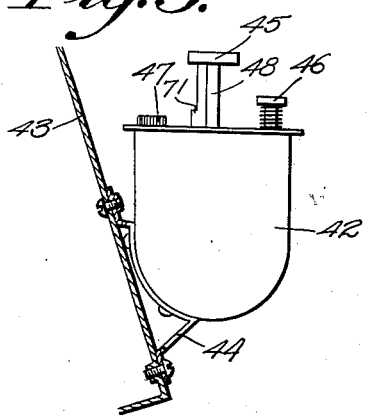
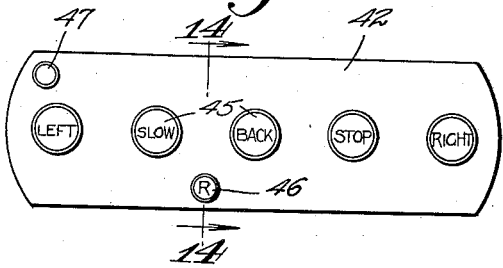
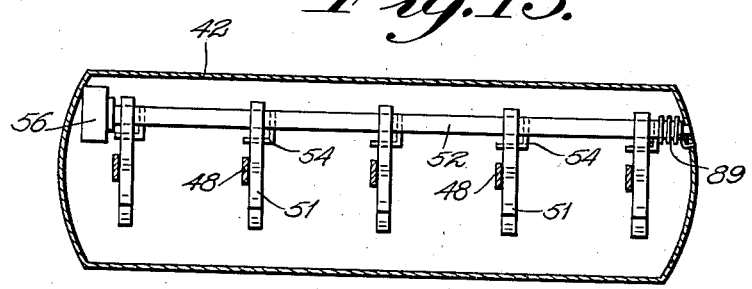
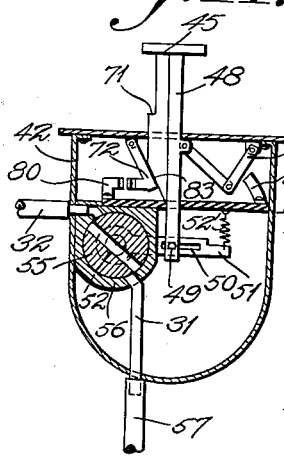
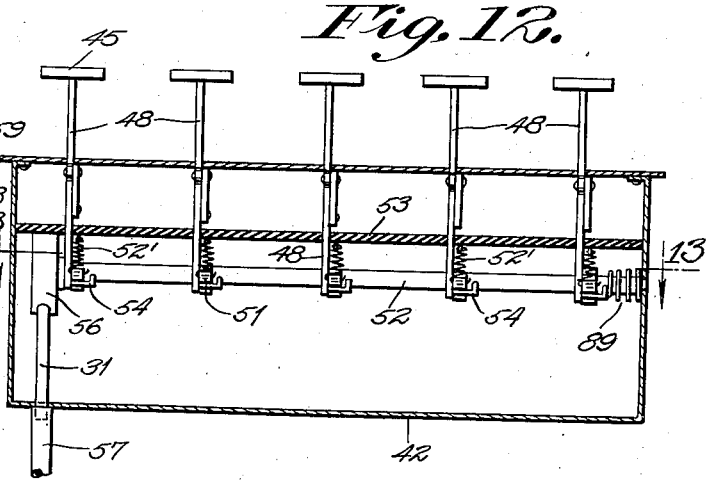
George W. Mason
INVENTOR
BY Victor J. Evans & Co.
ATTORNEYS
R. E. Wise.
WITNESS Dec. 6, 1938.  G. W. MASON  2,138,976
DIRECTION SIGNAL
Filed July 14, 1937  4 Sheets-Sheet 4
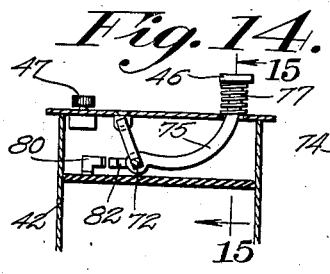
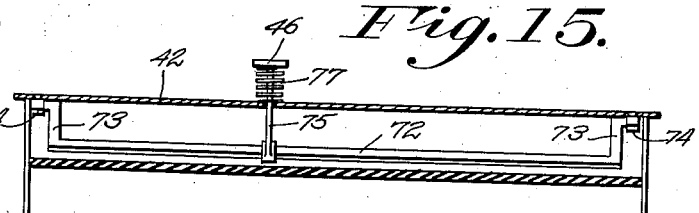
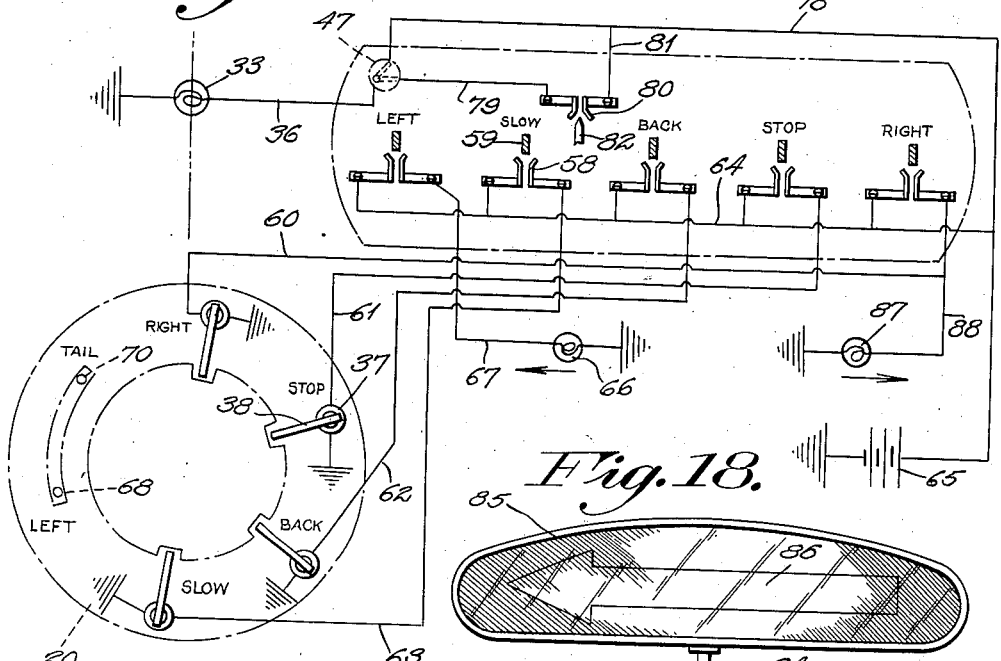
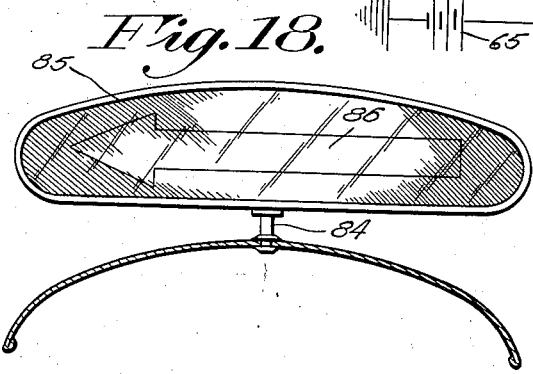
George W. Mason
INVENTOR
BY Victor J. Evans & Co.
ATTORNEYS
WITNESS Patented Dec. 6, 1938

2,138,976

UNITED STATES PATENT OFFICE 2,138,976

DIRECTION SIGNAL

George W. Mason, Long Beach, Calif.

Application July 14, 1937, Serial No. 153,597

3 Claims. (Cl. 177—327)

This invention relates to direction signals of the type described in Letters Patent issued to me May 29, 1923, No. 1,457,260.

An object of the present invention is to provide a direction signal in which the revolving signal cylinder will be actuated by air pressure and will be halted at the proper signal displaying positions by magnetically controlled stops.

A further object is to provide novel push buttons for selectively operating knife switches that control the electromagnets.

A further object is to provide in a device of this character a novel release mechanism for simultaneously releasing the signal cylinder to be returned to initial stop light displaying position by its torsional spring, said releasing mechanism having the additional function of opening the tail light switch when a signal is to be displayed thereby eliminating confusion.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 4 is a longitudinal sectional view of the signal casing and showing the illuminating lamp, the signal legend rotary cylinder, air motor and magnetically controlled stops.

Figure 5 is a perspective view of the signal legend bearing cylinder.

Figure 6 is a cross sectional view taken on the line 6—6 of Figure 4 showing the fiber disc and magnetically operated stops for checking the legend cylinder at predetermined points and also showing the tail light and left turn stops.

Figure 7 is a cross sectional view taken on the line 7—7 of Figure 4 showing the air motor in elevation.

Figure 8 is a cross sectional view taken on the line 8—8 of Figure 4 showing the reverse side of the fiber disc from that shown in Figure 6.

Figure 9 is an end elevation of the remote control mounted on the instrument board.

Figure 10 is a plan view of the remote control.

Figure 11 is a cross sectional view of the remote control showing the air valve, knife switch for controlling the electro-magnetic stop, push rod, lever operated thereby for opening the air valve, and release bar for releasing the push rod and simultaneously automaticaly closing the switch of the tail light.

Figure 12 is a longitudinal sectional view of the remote control showing the L-shaped hooks on the valve stem in position to be engaged by the push rod operated levers.

Figure 13 is a longitudinal sectional view of the remote control taken on the line 13—13 of Figure 12.

Figure 14 is a cross sectional view of the control taken on the line 14—14 and showing only the release bar, automatic switch for the tail light operated thereby, and the release bar push button.

Figure 15 is a longitudinal sectional view of the control taken on the line 15—15 of Figure 14.

Figure 16 is a plan view of the release bar.

Figure 17 is a diagrammatic view of the electrical connections of the knife switches, electro-magnets and automatic switch for the tail light.

Figure 18 is a front elevation of one of the signal casings for the front fenders.

Figure 1:
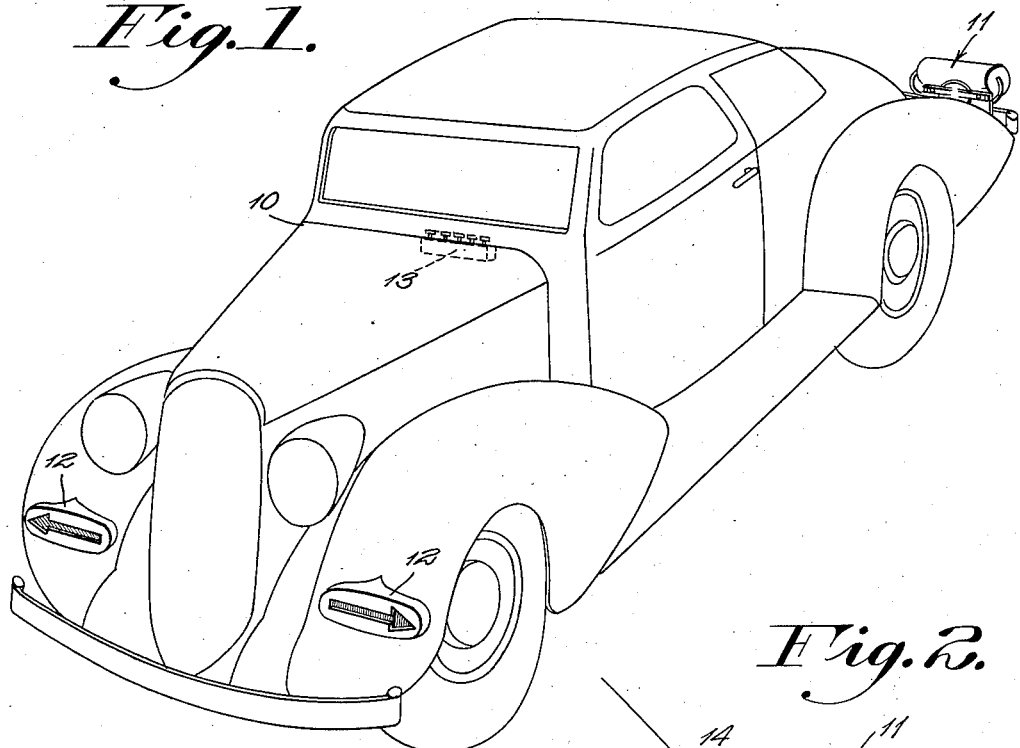
Figure 1 is a perspective view of an automobile equipped with a direction signal constructed in accordance with the invention.
Figure 2:
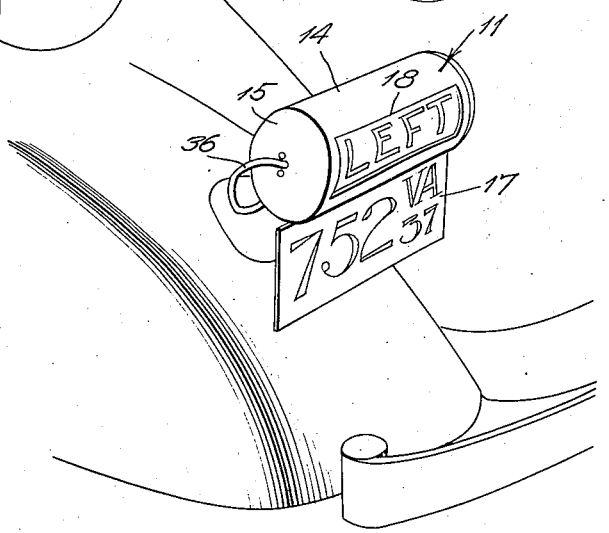
Figure 2 is a detail perspective view of the rear fender and signal casing mounted thereon.

Referring now to the drawings in which like characters of reference designate similar parts in the various views, 10 designates an automobile, having applied thereto a direction signal constructed in accordance with the invention and comprising generally a combined tail and rear signal lamp 11 carried by the left rear fender, front signal lamps 12 carried by the front fenders and a remote control 13 carried by the instrument board within convenient reach of the driver.

The combined tail and rear signal lamp comprises a cylindrical casing 14, best shown in Figure 4, closed by convex end walls 15. The bottom of the casing is provided with a transparent glass pane 16 for iluminating the license plate 17. The cylindrical wall of the casing is provided with an elongated sight opening 18 to expose the signal legends displayed on the signal cylinder 19.

The signal cylinder is formed of glass and is closed at the ends by perforated end walls 20 and 21 which may be formed of any suitable material. The cylinder is concentrically mounted in the casing 14 and is provided on the end walls 21 with a bearing 22 which rotatably supports the cylinder on a hollow stub shaft 23 which is secured stationary to the adjacent end wall of the casing by screws 24 or other suitable connectors. The opposite end wall 20 of the cylinder is equipped with a hub 25 which is rotatably mounted on a stub shaft 26 which is secured to the adjacent end wall of the casing by screws 27 or other connectors.

An annular disc 28 is fixed within the casing 14 for mounting electro-magnetic stop devices which will be presently described. Between this disc and the convex end wall 15 of the casing an air motor 29 is secured to the end wall by the same screws 27 which secure the stub shaft thereto. The air motor vanes 30 are secured to the hub 25 of the signal cylinder, as best shown in Figure 7. An air hose 31 enters the casing of the air motor and as will later be described this hose is connected to the remote control air valve for admitting the suction of the intake manifold against the vanes of the air motor to rotate the signal cylinder. An atmospheric air pipe 32 enters the casing of the air motor diametrically opposite the suction hose 31.

The signal cylinder 19 is provided with signal legends at spaced intervals apart. The legends "Stop" and "Back" will be formed of red letters displayed on the cylinder. The legend "Slow" will be formed of amber letters. The legends "Right" and "Left" will be formed of green letters. Between the right and left legends a red disc 33 is displayed on the cylinder and this disc forms a stop light when illuminated by the lamp 33 disposed axially in the signal cylinder. The red disc is always illuminated except when a signal legend is being displayed as will presently be described. The lamp socket 34 is carried by the stationary stub shaft 23 and the lamp globe is yieldably held by spring fingers 35 which project from the end of the stub shaft 26. The cable 36 carrying the electrical conductors is passed into the revoluble signal cylinder through the bore of the stationary stub shaft 23.

The annular disc 28 is formed of insulating material and mounted thereon is a concentric series of electro-magnets 37 corresponding to the signal legends "Slow", "Back", "Stop" and "Right", there being none corresponding to the legend "Left". Each electro-magnet is equipped with an armature 38 underneath which is located a spring retracted pin 39. The pin is slidably fitted in an opening in the disc 28 and when the electro-magnet is energized the armature forces the pin to project from the inner face of the disc into the path of movement of a lug 40 which projects from the end wall 20 of the cylinder 19, and halt rotation of the cylinder to display a selected signal legend at the sight opening 18 in the casing 14.

Figure 3:
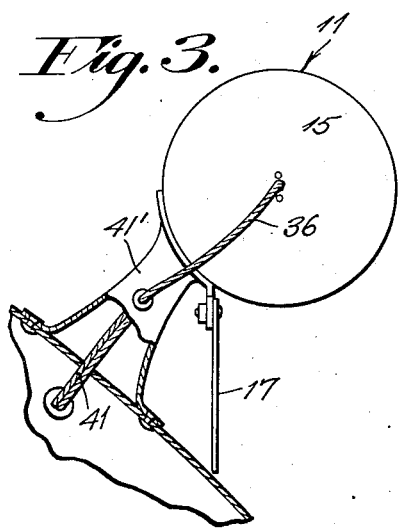
Figure 3 is an end elevation of the signal casing shown in Figure 2 with parts broken away.

The circuit wires for the electro-magnets are confined in a cable 41 which enters the lamp casing 14 and passes through the disc as best shown in Figures 4 and 8. This cable, and the circuit wires 36 for the lamp, are housed in a hollow bracket 41 which is secured to the left rear fender, as best shown in Figure 3.

The remote control apparatus is best shown in Figures 9 to 18 inclusive, and will now be described.

The remote control comprises a casing 42 which is secured to the instrument board 43 by a bracket 44, as best shown in Figure 9. The casing is provided with a flat top and arranged in a row above the top is a plurality of push buttons 45 which bear legends "Left", "Slow", "Back", "Stop", and "Right" as best shown in Figure 10.

Also a release button 46 is exposed above the top of the casing and a switch button 47 is disposed near one corner of the casing.

Each signal button 45 is mounted on the upper end of a respective push rod 48 which extends downward in the casing, as best shown in Figure 11 and at the lower end is provided with a pin 49 which slidably fits in a slot 50 formed in a lever 51 which is loosely mounted at one end on a shaft 52 that extends longitudinally in the casing and constitutes a valve stem for controlling admission of low pressure from the intake manifold to the air motor 29. A helical spring 52' is connected to a horizontal partition 53 and is connected to the outer end of the lever 51 for returning the lever to initial position after each actuation. A hook 54, best shown in Figures 12 and 13 projects from the valve stem 52 and engages underneath the lever so that when the push button is depressed to rock the lever the hook will be depressed to turn the valve stem 52.

A plug valve 55 is mounted in the valve casing 56 which is secured to the wall of the casing and to the partition 53. In open position the plug valve connects the beforementioned suction hose 32 of the air motor to a hose 57 which leads to the intake manifold of the motor vehicle. Each time a signal push button is depressed the valve will be opened and will remain open since the push rod is latched in operative position and cannot return to initial position until released as will be presently described. When the valve is open the air motor will rotate the signal cylinder until the lug 40 on the cylinder comes in contact with a selectively set pin 39 by energizing a predetermined electro-magnet as will now be described.

Adjacent to each push rod is the stationary contact 58 of a knife switch which is located on the partition 53. A jointed movable switch contact 59, best shown in Figure 11, is pivoted at one end to the top of the casing and at the other end is pivotally connected to the associated push rod 48. Consequently each time a signal push rod is depressed the associated knife switch will be closed to close respective circuits for the electro-magnets.

By referring to Figure 17 it will be seen that the right, stop, back and slow electro-magnets are connected to their respective knife switches by conductor wires 60, 61, 62 and 63, and a feed wire 64 common to all of the knife switches just mentioned, is connected to the battery 65. The left signal knife switch is connected to the left signal lamp 66 by a conductor wire 67 so that when the left signal button is depressed it controls only the left signal lamp on the front fender of the vehicle. However, when the left signal push rod is depressed the valve 55 will of course be opened and will rotate the signal cylinder 19 until the stop 40 thereof comes in contact with a stop 68 on the annular disc 28, best shown in Figures 8 and 17. Thus the signal cylinder will be halted in position to display the left legend at the sight opening to be illuminated by the lamp 32.

After each actuation of the signal cylinder, the cylinder will be returned to initial position by a torsional spring 69, best shown in Figure 4, which is sleeved on the stub shaft 23 and is connected to the end wall 15 of the casing and to the end wall 21 of the cylinder. When the cylinder is so returned it is halted by the lug 40 on the cylinder coming in contact with a stop lug 70 disposed on the annular disc 28, as best shown in Figures 6, 8 and 17 in which position the red stop light 33 is located at the sight opening 16 to be illuminated by the lamp continuously until another signal is to be given. When one of the signal buttons is depressed to display a signal as previously described the signal cylinder of course will be turned as indicated by the arrowhead in Figure 5 and will move the stop light out of registration with the sight opening so that the stop light will be extinguished and thus no confusing light will be burning when a signal is being displayed.

Each push button remains in depressed position until released by the releasing means which will now be described.

The releasing means is best shown in Figures 11, 14, 15 and 16. Referring to Figure 11 it will be seen that a shoulder 71 is formed on each push rod and when the push rod is depressed the shoulder engages underneath a horizontally extending release bar 72, best shown in Figures 14, 15 and 16 which is provided with crank arms 73 at the end, these crank arms being journaled in bearings 74 in the end walls of the control casing 42. The release bar is provided with an arcuate push rod 75 which extends upwardly through the bottom of the casing and is equipped with a button 76 displaying the insignia R to indicate release. A helical spring 77 is sleeved on the push rod underneath the button and normally holds the release bar 72 in operative position to engage the shoulder 71 of the signal push button 48. After a signal has been given the driver depresses the release button 75 to swing the release bar 72 off of the shoulder 71 on the signal push rod and release the latter which is immediately returned to neutral position by the beforementioned spring 52 on the lever 51, best shown in Figure 11.

For night driving the circuit wire 36 for the lamp 33 is connected to the battery by a wire 78 as best shown in Figure 17. The beforementioned switch 47 on the control casing is turned to connect the wire 78 to the wire 36 when the rear lamp 33 must be continuously energized for night driving. However, when it is necessary only to use this lamp for signaling as is necessary in daylight driving, the switch 47 is turned to connect the wire 36 with a wire 79 which runs to the stationary contacts of an automatic switch 80, the latter being connected by a wire 81 to said wire 78. The movable contact 82 of the automatic switch is carried by the release bar 72 as best shown in Figure 14. When one of the signal push rods 49 is depressed an oblique cam face 83 on the rod, best shown in Figure 11, urges the release bar 72 forwardly to a position to receive the shoulder 71 in which position the movable switch contact 82 of the automatic switch bridges the fixed switch contacts and closes the circuit from the battery to the light through the wires 78, 81, 79 and 36. When the release bar is released by depressing the release button 75, the release bar will be dislodged from the shoulder 71 permitting the push rod to rise and at the same time the control spring 77 of the release bar will move the release bar back against the cam face 83 of the push rod as best shown in Figure 11, and withdraw the movable switch contact of the automatic switch from the stationary switch contact to open the lamp circuit.

Disposed on the front fenders are the signal lamps 12 beforementioned and these may be built into the fender as shown in Figure 1, or as shown in Figure 18 may be a separate unit from the fender and attached to the fender by a bracket 84. The lamp casings are closed by glass panes 85 on which is painted a signal arrow 86. A single lamp bulb is disposed in each casing, the left signal lamp bulb 66, see Figure 17, being illuminated when the left signal push rod is depressed. The right signal lamp bulb 87 is connected by a wire 88 to the wire 60 which runs to the electromagnet corresponding to the right signal push rod so that when the latter is depressed the right signal lamp 87 on the front of the vehicle 33 will be energized simultaneously with the display of the right signal in the rear signal casing 14.

Referring to Figure 12 it will be seen that a torsional helical spring 89 is sleeved on the valve stem 52 for the purpose of closing the valve 55 when a driver releases a push rod after a desired signal has been completed.

Since the operation of the device has been described as the description of the parts progressed it is thought that the construction and operation of the invention will be fully understood without further explanation.

What is claimed is:

1. A direction signal comprising a revoluble signal cylinder having direction legends thereon, an air motor for revolving the cylinder, a pipe for connecting the motor with a source of vacuum, a valve in the pipe, manually operable push rods, respective levers connected to the push rods, a stem for the valve connected to and adapted to be operated by the levers to open the valve and start rotation of the cylinder each time a selected push rod is depressed to admit vacuum to the air motor, a circuit closer connected to each push rod, a circuit controlled by each circuit closer, an electro-magnetically controlled stop means in each circuit, the construction and arrangement being such that when a selected push rod is depressed the respective circuit closer is actuated to energize the electrically operated stop means to engage the cylinder and halt rotation thereof subsequent to opening of the valve to start rotation of the cylinder.

2. A direction signal comprising a revoluble signal cylinder having direction legends thereon, vacuum operated means for rotating the cylinder, a valve for controlling said means, electrically operated stop means concentrically arranged with respect to the cylinder and adapted to engage the cylinder and halt rotation of the cylinder to display a predetermined signal, manually operable push rods, means connected to the push rods and to the valve for opening the valve to effect rotation of a signal cylinder, a circuit for each stop means, a circuit closer in each circuit, means connecting each circuit closer with a respective push rod and closing the circuit closer when the push rod is depressed for controlling said stop means, means for locking the push rods in set position, releasing means for the push rods, said cylinder being transparent, an electric light in the cylinder for illuminating the legends, a circuit for said light, and means connected to and operated by the push rod releasing means for closing the last named circuit each time a push rod is actuated.

3. A direction signal comprising a revoluble signal cylinder having direction legends thereon, a plurality of electrically operated stop means, a stop on the cylinder engageable with selected ones of the stop means to halt rotation of the cylinder to display a predetermined legend, circuits for the stop means, manually operable push rods corresponding to respective ones of the circuits, a circuit closer connected to and operated by each push rod for closing the circuit of a selected one of the stop means to stop rotation of the cylinder when a respective push rod is depressed, an air motor connected to the cylinder for revolving the cylinder, a suction pipe connected to the air motor for actuating the motor, a valve in said pipe, means connecting the valve to the push rods for opening the valve to start rotation of the cylinder prior to actuation of said circuit closers when a selected push rod is depressed, means for locking the push rods in set position, releasing means for the push rods, said cylinder being transparent, an electric light in the cylinder for illuminating the legends, a circuit for said light, and a circuit closer in the last named circuit connected to and operated by the push rod releasing means for closing the light circuit each time a selected push rod is depressed.

GEORGE W. MASON.